March 12, 1957     J. N. WILLIAMS     2,785,287
VEHICLE HEADLIGHT GLARE REDUCING ATTACHMENT
Filed July 19, 1954     2 Sheets-Sheet 1
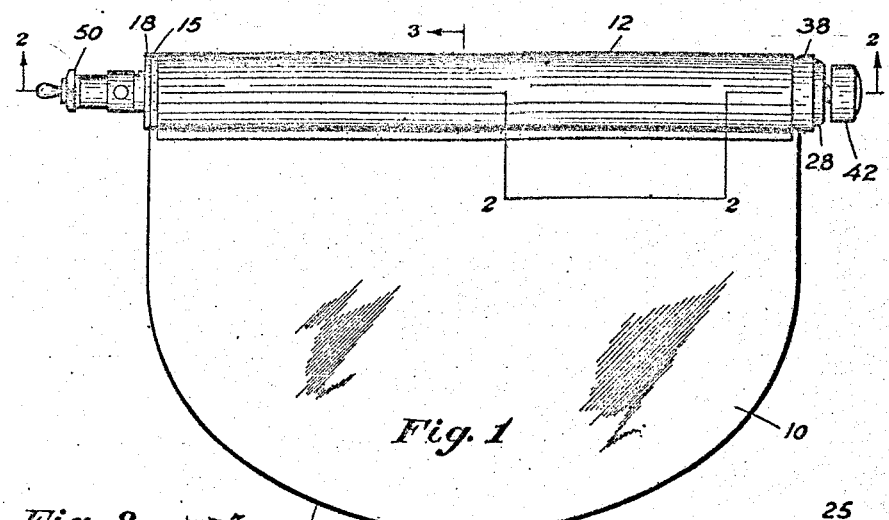
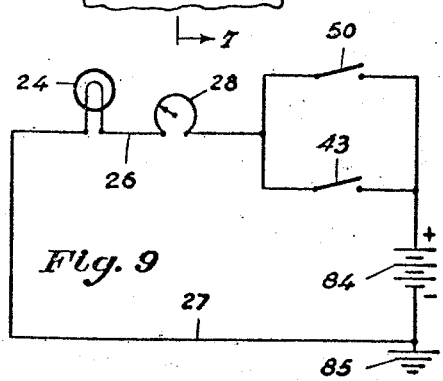
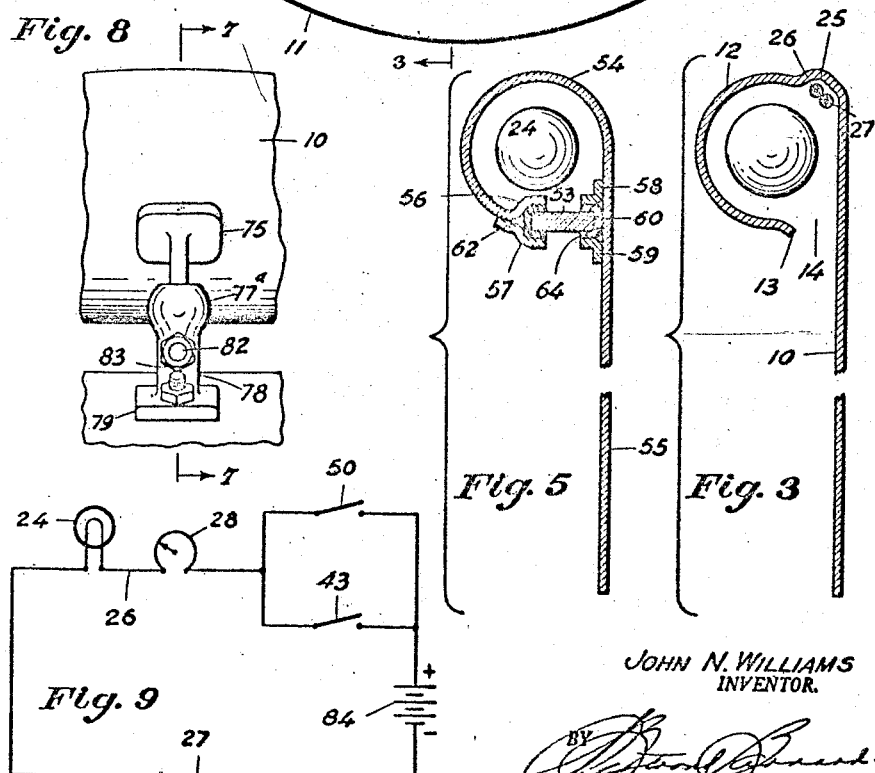
JOHN N. WILLIAMS
INVENTOR.
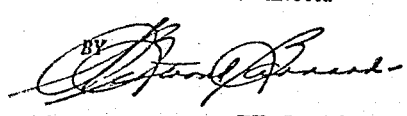
ATTORNEY

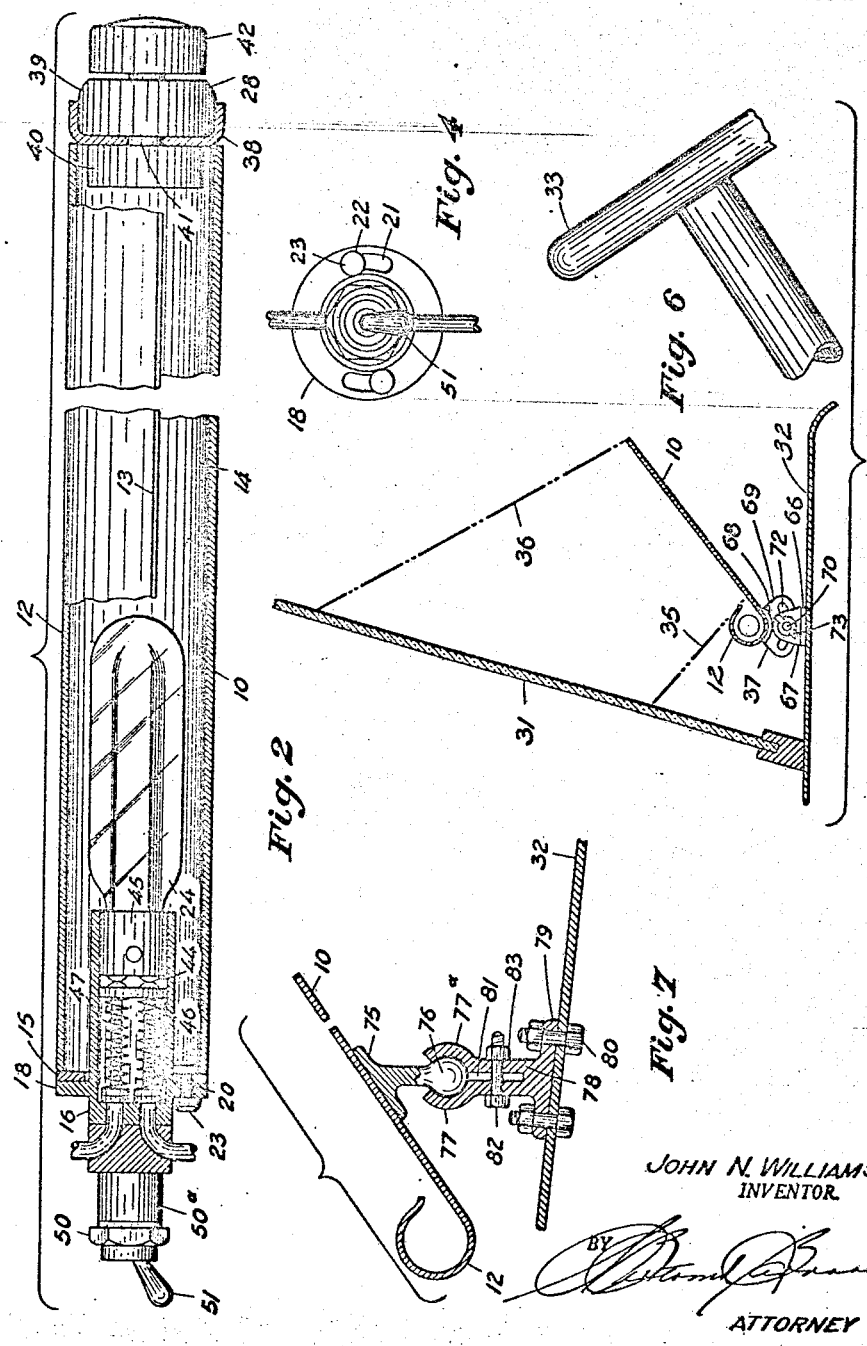

United States Patent Office 2,785,287
Patented Mar. 12, 1957

2,785,287

VEHICLE HEADLIGHT GLARE REDUCING ATTACHMENT

John N. Williams, Jamaica, N. Y.

Application July 19, 1954, Serial No. 444,140

7 Claims. (Cl. 240—7.1)

This invention relates to motor vehicles and is particularly directed to an attachment for mounting in the body of a motor vehicle behind the windshield thereof to diffuse the bright headlights of an approaching vehicle in order to reduce to a minimum the effect of the headlight glare on the eyes of a driver.

It is primarily directed to a device, which is electrically connected to and controlled by the dimmer switch provided in the conventional automobile, which will enable an operator to dim the headlights of his own vehicle and simultaneously diffuse the glare of the light from the headlights of an approaching vehicle, thereby reducing the effect of the headlight glare on the driver to a minimum.

The problem of glare of bright headlights of approaching vehicles has been a serious problem and a source of annoyance to vehicle operators for many years, and has become increasingly severe as the candlepower of the bulbs used in vehicle headlights has been increased, and as the speed of operation of the vehicles has been progressively increased.

While various devices for alleviating this condition have been made available, few if any have been found to be really satisfactory under a wide range of operating conditions.

Many glare diffusion devices take the form of pieces of colored plastic sheet material, or similar materials, which are attached to the inner surface of the windshield, in front of the operator, to diffuse the glare of headlights of approaching vehicles.

While these are effective to a certain extent, the colored material of the plastic sheet, which is located in front of the operator, tends to reduce his driving vision to a great extent, adds to the fatigue of driving, and alters the appearance of the colors of traffic lights and other types of signal lights encountered, so that they actually tend to complicate the driving problem.

While other devices of various types have been available, these are generally relatively complex, costly and require special handling and manipulation on the part of the driver, thus reducing the attention he can devote to the problem of actually handling and maneuvering the vehicle.

The primary object of my invention is to provide an attachment for a motor vehicle, which can be readily attached to vehicles, of a wide range of types and sizes, which will diffuse the brightness and glare of the headlights of approaching vehicles, and to electrically connect such attachment to the headlight dimmer switch of a vehicle so that the effect of the glare of bright headlights of an approaching vehicle is diffused and sharply reduced, simultaneously with the dimming of the headlights of the vehicle in which the unit is mounted, when another vehicle approaches in the opposite direction.

Another object is to provide an attachment, which is readily angularly adjustable, so that the glare diffusion effect on the vehicle windshield can be concentrated in a particular area, to suit the range of vision of a particular operator.

Another object is to provide an attachment, which is so electrically connected and controlled that it can be operated under a wide range of vehicle operating conditions to suit the individual requirements of a particular driver.

A primary feature of applicant's apparatus resides in the fact that it remains in operation only for the duration of the period during which another vehicle is approaching, the operator's vision through the vehicle windshield being entirely normal and free of any obstruction during all other periods.

Another feature of the apparatus is the fact that the intensity of the degree of glare diffusion precipitated by the apparatus can be readily and easily controlled and adjusted by the operator to provide relatively normal vision for the operator and to effectively diffuse approaching headlights of a wide range of glare intensity.

Another feature of the apparatus is the fact that it is actually in use, under complete control of the operator, for only a relatively short period of time, during which the dimmer switch is operated, and that no physical obstruction is placed within the range of vision of the vehicle operator, so that road vision is free and relatively unobstructed at all times.

Another object is to provide a unit which can be readily attached to, or removed from the vehicle, without special tools or skills, can be adjusted by the operator in a relatively short time without special tools or equipment, and will retain its adjustment over a sustained period, without special attention on the part of the operator of the vehicle in which the diffuser unit is mounted.

The accompanying drawings, illustrative of one embodiment of my invention, and several modifications thereof, together with the description of their construction and the method of installation, operation and utilization thereof, will serve to clarify further objects and advantages of my invention.

In the drawings:

Fig. 1 represents a plan view of the combination reflector plate and tubular lamp housing of the headlight diffuser combination.

Fig. 2 is a partial vertical section and a partial front elevation of the tubular lamp housing of the unit shown in Fig. 1, taken at 2—2, Fig. 1.

Fig. 3 is a cross-section through the tubular lamp housing and the reflector plate, shown in Figs. 1 and 2, taken at 3—3, Fig. 1.

Fig. 4 is a side elevation of the tubular portion of the unit shown in Fig. 1, showing the manually operated auxiliary switch and the support mechanism for attaching the lamp socket support flange to the tubular housing.

Fig. 5 is a cross-section, similar to Fig. 3, through a modification of the unit shown in Figs. 1 and 3, a narrow strip window being fitted to the space between the end of the tubular lamp housing and the reflector plate.

Fig. 6 is a partial cross-section through the windshield and the upper ledge of the instrument panel of a motor vehicle, and a cross-section through the headlight diffuser unit, shown in Figs. 1 and 2, in the mounted position, showing one type of angularly adjustable bracket supporting the headlight diffuser unit.

Fig. 7 is a vertical section through the windshield of a motor vehicle, similar to Fig. 6, and a vertical section through a modification of the reflector plate support bracket shown in Fig. 6, the bracket being universally angularly adjustable over a wide angular range.

Fig. 8 is a rear elevation of the headlight diffuser unit and the universally adjustable mounting bracket therefor, shown in Fig. 7.

Fig. 9 represents a schematic wiring diagram showing the method of connecting the lamp socket, the rheostat and the manually operated switch, shown in Fig. 1 to the dimmer switch of a motor vehicle.

It will be understood that the following description of the construction and the method of installation, operation and utilization of the vehicle headlight glare reducing attachment is intended as explanatory of the invention and not restrictive thereof.

One embodiment of the construction, shown in Figs. 1, 2 and 3, comprises a flat reflector plate 10, formed of thin sheet steel or other material, the front edge 11 of the flat reflector plate being of arcuate contour, and a thin-walled tubular housing section 12 formed integral with one side of the reflector plate 10, the forward edge 13 of the tubular housing section being located a short distance from the upper surface of the flat reflector plate, so that a narrow gap 14 extending along the entire length of the tubular housing is formed between the bottom forward edge of the tubular housing section 12 and the upper surface of the reflector plate 10.

As indicated in Fig. 2, one end of the tubular housing section 12 is bent upward to form a support disc 15, or a separate support disc following substantially the tubular housing contour may be attached to the adjacent open end of the housing, the support disc having a circular opening therethrough to receive and support a cylindrical lamp socket 16, which is inserted therethrough. A substantially circular socket support flange 18 either integral with or attached to the socket 16, is removably attached to the outer surface of the support disc 15.

The socket support flange may be removably attached to the support disc 15 by a pair of headed pins or screws 20, fitted through openings in the support disc 16. A set of circular segmental slots 21 is cut through the socket support member around the central opening through the disc, as indicated in Fig. 4; each of the circular segmental slots having a circular opening 22 through one end thereof, to clear a substantially cylindrical head 23 integral with each of the pins or screws 20, attached to the disc.

A tubular lamp socket 16 having a head integral with one end thereof is attached to or integral with the socket support flange 18, the lamp socket extending into the interior of the tubular housing section 12, a cylindrical or other form of light bulb 24 being removably fitted to the lamp socket 16 to illuminate the upper surface of the reflector plate 10 through the narrow gap 14 located between the forward bottom edge of the tubular housing and the top of the reflector plate.

As indicated in Fig. 3, the outer rear wall of the tubular housing 12 is offset at a point near the junction with the reflector plate 10, the offset section 25 of the housing forming a longitudinal channel of substantially rectangular cross-section adjacent the inner circumference of the tubular housing section 12, the channel running along substantially the entire length of the tubular housing section 12 and receiving a pair of wires 26 and 27 connecting the lamp socket 16, located at one end of the tubular housing, with a rheostat 28 located at the opposite end of the tubular housing 12, thus supporting the wires 26 and 27 in a position clear of the inner circumferential surface of the tubular housing 12, and thereby reducing to a minimum the interference caused by the wires extending longitudinally along the housing to the transmission of light from the light bulb 24, shown in Fig. 2, through the gap 14 between the forward bottom edge of the tubular housing section 12 and the plate to the reflector plate 10.

As indicated in the mounting drawing, Fig. 6, the duffuser unit is mounted near the inner surface of the windshield 31 of the vehicle, the reflector plate 10 being supported at an angle to the inner windshield surface by an adjustable bracket, mounted on the upper ledge 32 of the dashboard, or instrument panel of a vehicle, in substantially the position shown in Fig. 6, the headlight diffuser unit being mounted between the windshield 31 and the steering wheel 33 of the vehicle, slightly below the normal driving range of vision of the operator of the vehicle.

The upper surface of the reflector plate 10 of the unit is coated with a dull flat yellow or amber coating or paint, so that it cast a dull colored reflection against the inner surface of the windshield, when the light from the bulb 24 in the tubular housing section passes through the gap 14 between the bottom of the tubular housing section and the reflector plate, and is reflected against the inner windshield surface by the reflector plate 10.

The colored reflection on the windshield covers an area within the range of vision of the operator, as shown in Fig. 6, the reflected area being defined by the lines 35 and 36, shown in Fig. 6, the exact position of the reflected area being controlled by adjusting the angular position of the reflector plate 10 by means of the adjustable mounting bracket 37, so that the reflected light diffusion area is located within the normal range of vision of the operator of the vehicle.

The colored area reflected by the plate 10 of the unit against the inner surface of the windshield tends to diffuse the glaring rays of the bright headlights of an approaching vehicle, thus sharply reducing the eyestrain on the operator of the vehicle in which the unit is mounted.

Another support disc 38, or dished cup following substantially the contour of the tubular housing section 11 is attached to, or formed integral with the opposite end of the tubular housing, opposite the bulb socket 16, as indicated in Fig. 2, the right-hand support disc supporting a rheostat 28, which controls the intensity of the light given off by the light bulb 24, by regulating the flow of current through the lamp socket 16, thus controlling the intensity of the colored light diffusion area reflected on the inner windshield surface.

The rheostat 28 comprises a body 39, fitted to the outer surface of the right-hand support disc and a substantially cylindrical auxiliary section 40 fitted to the inner surface of the right-hand support disc 38 of the tubular housing, the inner auxiliary section 40 of the rheostat having the operating mechanism thereof supported thereby, and a rheostat control shaft 41 rotatably fitted through an opening in the support disc. The control shaft has a control arm attached thereto, the control arm and the operating mechanism mounted in the inner auxiliary section of the rheostat regulating the flow of current through the rheostat, when the control shaft is rotated. A substantially cylindrical control knob 42 projects beyond the right-hand end of the tubular housing section 12, the control knob attached to the control shaft 41 controlling the rotational movement of the control shaft and the control arm attached thereto, thereby regulating the flow of current through the rheostat outlet and the light bulb socket 16 connected thereto.

As the wiring to the light bulb socket 16, mounted in the tubular housing section 12, is connected to the foot operated dimmer switch 43 of the vehicle, as indicated in the wiring diagram, Fig. 9, the operator of the vehicle, when he controls the dimming of his own headlights, simultaneously energizes the light bulb 24 mounted in the tubular housing 12, thereby directing a diffusing colored reflected area against the inner surface of the windshield and reducing the eyestrain on the driver as a result of the bright headlights of an approaching vehicle in the manner hereinbefore described.

The light bulb 24, which is removably fitted to a bayonet type of tubular socket 16, has a pair of contacts 44 projecting beyond the substantially cylindrical base 45 thereof, the socket 16 having a pair of sliding contacts 46 mounted therein, in substantial alignment with the light bulb contacts, the outward movement of the socket sliding contacts 46 being controlled by a pair of coiled compression springs 47, or other type of compression elements fitted thereto, the compression springs in the bulb socket, which surround the sliding contacts 46, forcing the sliding contacts 46 into positive engagement with the light bulb base contacts 44. In place of the socket and the light bulb base construction, shown in Fig. 2, another type of light bulb and socket combination, including a screw type socket, or other removable type of light bulb and socket construction may be substituted, the light bulb being mounted in essentially the same location relative to the tubular housing section, or the light bulb may be moved inward, closer to the longitudinal center of the tubular housing section 12, the bulb socket 16 being either lengthened or extended to the position required to support the light bulb, or the socket may be moved into the interior of the tubular housing section, a socket extension being fitted to the socket support member 18, in place of the socket, shown in Fig. 1, in the manner hereinbefore described.

As indicated in Fig. 2, a manually operated switch may be fitted to the outer end of the lamp socket body, beyond the socket support flange located at the left-hand end of the tubular housing, Fig. 2, the manually operated switch being used interchangeably with the foot controlled dimmer switch 43 in controlling the operation of the light bulb, as shown in the wiring diagram, Fig. 9.

The manually operated switch 50 comprises a substantially cylindrical, or other form of housing 50a, attached to the outer end of the lamp socket 16, the switch operating mechanism being supported by the switch housing 50a in the conventional manner.

A switch control knob or lever 51 is mounted at the outer end of the manually operated switch housing 50a, the switch control lever being pivotally supported in the switch housing by a ball joint or other type of pivot joint fitted to a mating type of ball socket formed in the switch housing 50a.

As indicated in the wiring diagram, Fig. 9, the manually operated switch 50 may be used interchangeably with the vehicle dimmer switch 43 in controlling the energizing of the light bulb 24, through the socket 16 in which it is mounted.

The light bulb 24 proper may be of substantially cylindrical outer contour with the forward end thereof of hemispherical contour, as indicated in Fig. 2, or another type of light bulb may be substituted therefor, the other features of the construction and the operation of the unit remaining essentially the same.

In operating the light diffuser unit, shown in Figs. 1, 2 and 3, the dimmer switch 43 is employed for controlling the energizing of the light bulb 24 through the socket 16 into which it is fitted, for simultaneously dimming the headlights of the vehicle in which the unit is mounted when another vehicle approaches, to diffuse the effect of the bright headlights of an approaching vehicle on the driver of the vehicle in the manner hereinbefore described.

For operating a vehicle in a town, or other densely populated community in which bright headlights are not normally used, so that the dimmer switch 43 is not ordinarily necessary, the manually operated switch 50, shown in Fig. 2 is employed, the driver of the vehicle throwing the pivoted control lever 51 of the manually operated switch 50 to the "on" position to energize the light bulb and diffuse the effect of the bright headlights of an occasional approaching vehicle fitted with bright headlights, in the manner hereinbefore described.

In a modification of the light diffuser unit, shown in Fig. 5, a narrow strip of relatively thin frosted glass 53 is inserted in the gap between the forward bottom edge of the tubular housing section 54 and the upper surface of the reflector plate 55, to protect the inner surface of the tubular housing section 54 and the light bulb 24 from dust, moisture and other atmospheric conditions.

The lower end of the forward wall of the tubular housing 54, in the modified construction, is bent inward, as indicated in Fig. 5, to form a section 56 of a channel to support the glass window 53, a mating channel section 57 formed of sheet material being attached to the wall of the tubular housing by welding, spot welding, or other suitable attaching means, the two channel sections 56 and 57 forming a rectangular channel to receive the upper end of the glass window 53. A pair of angles 58 and 59 is attached to the upper surface of the reflector plate 55 at opposite sides of the window 53, the gap between the vertical legs of the angles 58 and 59 forming a rectangular channel 60 in substantial alignment with the upper channel sections 56 and 57 to support the window 53 located substantially perpendicularly to the reflector plate surface.

A packing strip 62 formed of a compressible sheet material, such as sheet rubber, or a similar sheet or molded material, is fitted to the upper edge of the narrow glass window 53, the packing strip accurately fitting the window channel section 56 at the lower forward edge of the tubular housing 54 and the mating channel section 57 adjoining it, to align and retain the upper edge of the window 53.

A similarly formed packing strip 64 is fitted around the bottom edge of the window strip 53, as indicated in Fig. 5, the sides of the packing strip engaging the vertical legs of the angles 58 and 59, forming the bottom window channel, thereby accurately aligning the bottom edge of the window with the upper edge thereof.

In order to vary the angular position of the reflector plate 10 of the unit, relative to the windshield 41, to adjust the position of the reflected area directed by the reflector plate to the windshield inner surface, the diffuser unit is supported by an adjustable support mechanism, shown in Fig. 6.

In the construction shown in Fig. 6, a bracket comprising a base 66 attached to the upper surface of the instrument panel ledge 32, and a vertical column section 67 located in a plane substantially perpendicular to the longitudinal axis of the tubular housing section 12, is mounted below the tubular housing section 12, at substantially the longitudinal center thereof. A mating housing support bracket is attached to the bottom of the tubular housing section 12 in substantial alignment with the longitudinal axis thereof, the housing support bracket comprising an upper flange 68 following the outer contour of the tubular housing section 12 and attached thereto, and a substantially perpendicular support section 69, located in substantial alignment with the column section 67 of the lower bracket and abutting one surface thereof. A clamp bolt 70 is fitted through an opening in the column section 67 of the lower bracket, a parallel-edged circular segmental slot 72 being cut through the support section of the housing support bracket in alignment with the opening through the lower bracket column section. The body of the clamp bolt 70 fitted through the opening in the lower bracket column section extends through the circular segmental slot 72 in the support section 69 to support the housing bracket support section, a wing nut 73, or other type of clamping member, threadably attached to the clamp bolt body 70, being employed to clamp the support section of the housing bracket to the column section of the lower bracket.

In adjusting the angular position of the reflector plate 10 relative to the windshield, in a plane perpendicular to the longitudinal axis of the tubular housing section 12, the upper bracket is angularly displaced along the circular segmental slot 72 through the housing bracket support section, until the reflector plate 10 assumes the desired angular position relative to the windshield, after which the wing nut 73 fitted to the bolt 70, is tightened against the bracket support section, thereby gripping the housing bracket support section and locating the reflector plate 10 in the desired angular position relative to the windshield.

In order to provide a reflector plate adjustment in a plane through the longitudinal housing axis, a modified type of support construction, such as that shown in Figs. 7 and 8 is employed.

In this construction, a plate bracket comprising an angularly positioned upper flange 75 abutting the bottom surface of the reflector plate 10 and attached thereto, and a spherical ball end 76 depending from the upper flange and integral therewith, is employed to adjustably support the reflector plate 10. The ball end 76 of the plate bracket is fitted to a mating split spherical segmental socket 77 and 77a formed integral with the upper end of the lower bracket, shown in Figs. 7 and 8. The opposite sections 77 and 77a of the spherical segmental socket, which are separated by a slot cut through substantially the center of the socket 77 and 77a and the supporting column thereof, are integral with a depending vertical column 78, the lower end of which is integral with a base 79, attached to the upper surface of the vehicle instrument panel ledge 32. The plate bracket base 79 may be attached to the upper ledge 32 of the vehicle instrument panel by a plurality of bolts or screws 80, such as those shown in Fig. 7, or by other suitable attaching means. The vertical column 78 of the lower bracket has a slot 81 therethrough, the slot 81 dividing the upper portion of the column 78 and the spherical segmental socket into two parts thereby forming the socket sections 77 and 77a. An opening is provided through the two sections of the column 78 of the bracket below the socket sections 77 and 77a, a bolt 82 fitted through the opening being provided to clamp the two sections 77 and 77a of the spherical segmental socket against the ball end 76 of the plate bracket. A nut 82, wing nut, or other type of clamping member threadably attached to the forward end of the clamp bolt 82, is provided to clamp the two sections 77 and 77a of the spherical segmental socket against the ball end 76 of the plate bracket.

This enables the operator to adjust the angular position of the reflector plate 10 in any plane relative to the vehicle windshield 31, by moving the reflector plate 10 through any desired angle about the ball end 76 of the plate bracket as a center, and clamping the socket sections against the ball end in the adjusted position by means of the clamp bolt 82 and the nut 83 threadably fitted thereto.

This enables the operator to adjust the angular position of the reflector plate to any desired angle relative to the windshield surface, in any plane about the ball end 76 of the plate support bracket, thus enabling the operator of the vehicle to readily control the position of the light diffusion area reflected from the reflector plate 10 against the inner surface of the windshield, so that the light diffusion area is held definitely within the normal range of vision of the operator.

The mounting brackets, shown in Figs. 6 and 7, can normally be located at substantially the longitudinal center of the reflector plate 10.

Where there is an obstruction or other protuberance on the upper ledge 32 of the instrument panel, or where for other reasons it is desirable to offset the bracket relative to the reflector plate, the bracket can be mounted closer to one end of the reflector plate, the plate proper being located directly in front of the vehicle operator in substantially the same position as when a centrally located bracket is used, as indicated in Figs. 6 and 7.

In the wiring diagram shown in Fig. 9, the current flows from the positive (+) side of the vehicle battery 84, through the dimmer switch 43 of the vehicle to the rheostat 28, located at one end of the tubular housing section 12. From the rheostat, the current flows to the sockets 16 of the light bulb 24 through one of the lines 26 or 27, running through the channel located adjacent the inner circumferential surface of the tubular housing. Where a double contact type of bulb and socket construction, such as those shown in Fig. 2 are used, the return line 27 from the outlet terminal of the bulb socket 16 is returned to the negative (—) side of the battery 84.

Where a single contact type of bulb and a mating socket are used, the outlet terminal of the lamp socket is connected to a ground 85 located at any suitable point on the vehicle chassis, from which it is connected to the negative side of the battery 84.

The operation of the unit shown in Figs. 1 and 2, and in the mounted position, in Figs. 6 and 7, is as follows:

The reflector plate 10 of the unit is adjusted to the angular position required, relative to the windshield by angularly moving the housing support bracket along the circular segmental slot 72 cut through the support section 69 of the housing support bracket, to the angular position giving the required reflected diffusion area on the inner surface of the windshield 31, to suit the range of vision of the operator of the vehicle.

The operator adjusts the intensity of the reflection of the light diffusion area on the inner surface of the windshield 31 by rotating the control knob 42 of the rheostat 28 to the required position.

When the modified type of unit shown in Fig. 5 is used, the operation of the unit is substantially the same as that shown in Figs. 1 and 2 and hereinbefore described, the light from the bulb 24 in the tubular housing section passing through the narrow window 53 at the bottom of the tubular housing to the reflecting surface of the reflector plate 55, from which it is reflected to the inner surface of the windshield 31 in the manner hereinbefore described.

Where the diffuser unit is mounted on the universal type of support bracket, shown in Figs. 7 and 8, the operator adjusts the angular position of the reflector plate 10 relative to the windshield, the angular adjustment being made in any plane relative to the windshield about the ball end of the reflector plate bracket, shown in Fig. 7, until the desired reflected diffusion area is obtained on the inner surface of the windshield. The intensity of the reflected light diffusion area on the windshield surface is adjusted by rotating the control knob 42 of the rheostat 28 to the desired position, the adjusted rheostat position being maintained for a sustained period unless the vehicle operating conditions are changed.

Thus a double contact bulb and socket, such as those shown in Fig. 2 may be utilized, or a single contact bulb and socket of the type frequently used on motor vehicles, substituted therefor.

The position of the mounting brackts, shown in Figs. 6, 7 and 8, relative to the reflector plate 10 may be varied considerably, and the construction and the method of angular adjustment of the brackets varied to obtain the desired degree of angular adjustment of the reflector plate 10 in order to locate the reflected glare diffusion area in the desired position on the inner surface of the windshield to suit the range of vision and operating requirements of the operator of the vehicle.

The size and the outer contour of the reflector plate may be varied considerably, depending upon the space available between the inner surface of the windshield and the steering wheel of the vehicle, and upon the size of the reflected diffusion area on the windshield required to suit the range of vision of the driver, and the angular position of the windshield relative to the body of the vehicle.

The mounting brackets shown in Figs. 6 and 7 may be mounted at substantially the center of the longitudinal centerline of the reflector plate, or offset in either direction, depending upon the location of the mounting position of the reflector relative to the normal area of vision of the operator of the vehicle.

Where there is a raised section of the instrument panel ledge, located adjacent a relatively flat area, the mounting brackets would be offset from the longitudinal centerline of the reflector plate to enable the reflector plate to clear the obstruction when it is tilted into an angular position.

The method of adjusting the angular position of the housing support bracket relative to the mounting bracket, shown in Fig. 6, may be varied considerably, depending upon the size of the brackets and the space available for the angular adjustment thereof.

The method of attaching the mounting bracket to the ledge of the instrument panel may also be varied considerably, depending upon the construction of the instrument panel ledge and the position thereof relative to the windshield and the other parts of the vehicle body.

The construction and the method of support and mounting of the rheostat, shown in Fig. 2, may also be varied considerably, the rheostat being supported by a support disc or cup, attached to the tubular housing section, or it may be supported by other suitable attaching means, which is in turn attached to the tubular housing section of the unit.

The tubular housing section may be formed integral with the reflector plate in the manner shown in Figs. 1 and 3, or a separate tubular housing may be utilized, the tubular housing being riveted, welded, brazed, or otherwise attached to the reflector plate, the essentials of the construction and the method of operation and utilization of the unit remaining substantially the same.

It will be apparent to those skilled in the art that my present invention is not limited to the specific details described above and shown in the drawings, and that my present invention is not limited to the specific details described above and shown in the drawings, and that various modifications are possible in carrying out the features of the invention and the operation, actuation, the method of support and mounting, and the method of utilization and operation thereof, without departing from the spirit and scope of the appended claims.

What I claim is:

1. A motor vehicle headlight diffuser for attachment to a motor vehicle body having a transparent windshield and an instrument panel ledge located behind the windshield, comprising a relatively flat reflector plate, a tubular housing section integral with one edge of the reflector plate, the inner edge of said tubular housing section located near the reflector plate being substantially parallel to the reflector plate, with a gap formed between the edge of the tubular housing and the reflector plate surface, the reflecting surface of said reflector plate having a dull colored coating thereon, a lamp socket fitted to one end of the tubular housing section, means for removably attaching the lamp socket to the tubular housing section, a light bulb removably fitted to said lamp socket, means for supplying electrical energy to said lamp socket, means fitted to said tubular housing for controlling the intensity of the flow of current to the lamp socket, means operative to control the flow of current to the lamp socket, the coated surface of said reflector plate being operative to cast a colored reflection against the inner surface of the windshield to diffuse the glare of light passing through the windshield.

2. A motor vehicle headlight diffuser for attachment to a motor vehicle body having a transparent windshield and an instrument panel ledge located behind the windshield, comprising a substantially flat reflector plate, a tubular housing section integral with one edge of the reflector plate, the inner edge of said tubular housing section, located near the reflector plate, being substantially parallel to the reflector plate, with a narrow gap formed between the inner edge of the tubular housing section and the reflector plate surface, the reflecting surface of said reflector plate having a dull colored coating deposited thereon, a disc attached to one end of the tubular housing section, a lamp socket removably attached to the tubular housing disc fitted to the tubular housing section, a light bulb removably fitted to the lamp socket, means connected to the lamp socket for supplying electrical current to the lamp socket, a rheostat fitted to the end of the tubular housing opposite the lamp socket, means for manually controlling the rheostat to regulate the flow of current to the lamp socket, switch means operative to control the supply of current to said rheostat, the coated surface of the reflector plate being operative to reflect light from the light bulb against the inner windshield surface to diffuse the glare of light passing through the windshield.

3. A motor vehicle headlight diffuser for attachment to a motor vehicle body having a transparent windshield and an instrument panel ledge located behind the windshield, comprising a relatively flat reflector plate, a tubular housing section integral with one edge of said reflector plate, the inner edge of said tubular housing section being substantially parallel to and located a short distance from the adjacent reflector plate surface, the upper surface of said reflector plate having a colored coating deposited thereon, a lamp socket removably attached to the tubular housing section, a light bulb removably fitted to said lamp socket, a bracket attached to the reflector plate adjacent the tubular housing section, a support bracket attached to the instrument panel ledge in substantial alignment with the reflector plate bracket, means for clamping the reflector plate bracket to the support bracket attached to the instrument panel ledge, means for adjusting the angular relation of the reflector plate bracket to the support bracket, the coated surface of the reflector plate being operative to reflect the light from the light bulb against the inner windshield surface.

4. A motor vehicle headlight diffuser for attachment to a motor vehicle body having a transparent windshield and an instrument panel ledge located behind the windshield, comprising a relatively flat reflector plate, a tubular housing section integral with one edge of the reflector plate, the inner edge of the tubular housing section, located near the reflector plate, being substantially parallel to the reflector plate surface, with a gap formed between the edge of the tubular housing section and the reflector plate surface, the reflecting surface of said reflector plate having a dull colored coating deposited thereon, a lamp socket removably attached to one end of the tubular housing section, a light bulb removably fitted to said lamp socket, a mounting bracket attached to the reflector plate adjacent the tubular housing section, a support bracket attached to the instrument panel ledge in substantial alignment with the reflector plate mounting bracket, means fitted through the support bracket for clamping the reflector plate mounting bracket to the support bracket, the reflector plate mounting bracket having a circular segmental slot therethrough in operative alignment with the bracket clamping means for adjusting the angular position of the reflector plate mounting bracket relative to the support bracket in a plane substantially perpendicular to the tubular housing section longitudinal axis, the coated surface of the reflector plate being operative to reflect light from the lamp bulb against the inner surface of the windshield to diffuse the glare of light passing through the windshield.

5. A motor vehicle headlight diffuser for attachment to a motor vehicle body having a transparent windshield and an instrument panel ledge located behind the windshield, comprising a substantially flat reflector plate, a tubular housing section integral with one edge of the reflector plate, the inner edge of the tubular housing section located near the reflector plate being substantially parallel to the reflector plate, with a gap formed between the edge of the tubular housing and the reflector plate surface, a narrow window fitted to the gap between the tubular housing section edge and the reflector plate surface, means attached to the tubular housing section for supporting one edge of the window, means attached to the reflector plate for supporting the opposite edge of said window, the reflecting surface of said reflector plate having a dull colored coating deposited thereon, a lamp socket removably attached to one end of the tubular housing section, a light bulb removably fitted to the lamp socket, a rheostat attached to the tubular housing section, said rheostat being operative to regulate the flow of current to the lamp socket, and switch means operative to control the flow of current to the lamp socket, the coated surface of the reflector plate being operative to reflect the light from the light bulb passing through the narrow window, against the inner surface of the windshield to diffuse the glare of light passing through the windshield.

6. A motor vehicle headlight diffuser for attachment to a motor vehicle body having a transparent windshield and an instrument panel ledge located behind the windshield, comprising a flat reflector plate, the forward edge of which is of arcuate contour, a tubular housing section integral with one edge of the reflector plate, the inner edge of the tubular housing section opposite the junction with the reflector plate being substantially parallel to the reflector plate surface, with a gap formed between the open edge of the tubular housing section and the reflector plate, the reflecting surface of the reflector plate having a dull colored coating deposited thereon, a support disc attached to one end of the tubular housing, a lamp socket removably attached to the support disc, a light bulb removably fitted to the lamp socket within the tubular housing section, a rheostat support disc attached to the other end of the tubular housing section, a rheostat attached to the rheostat support disc, a mounting bracket attached to the reflector plate, a support bracket attached to the instrument panel ledge in substantial alignment with the reflector plate mounting bracket, means fitted through the support bracket for clamping the reflector plate mounting bracket, the reflector plate mounting bracket having a circular segmental slot therethrough in operative alignment with the bracket clamping means for adjusting the angular position of the reflector plate mounting bracket, the coated surface of the reflector plate being operative to reflect light from the light bulb against the inner surface of the windshield.

7. A motor vehicle headlight diffuser for attachment to a motor vehicle body having a transparent windshield and an instrument panel ledge located behind the windshield, comprising a substantially flat reflector plate, an open tubular housing section integral with one edge of the reflector plate, the inner edge of the tubular housing section located near the reflector plate being substantially parallel to the reflector plate, with a gap formed between the open edge of the tubular housing section and the reflector plate surface, the reflecting surface of the reflector plate having a dull colored coating deposited thereon, a lamp socket removably attached to one end of the tubular housing section, a light bulb removably fitted to the lamp socket, a mounting bracket attached to the reflector plate, said mounting bracket having a ball end integral therewith, a support bracket attached to the instrument panel ledge, in substantial alignment with the mounting bracket, the support bracket having a spherical segmental socket integral therewith, the spherical segmental socket being operative to receive and support the ball end of the mounting bracket to permit substantially universal angular adjustment of the reflector plate relative to the windshield, the spherical segmental socket having a slot therethrough to divide the socket into two sections, means for clamping the socket sections against the mounting bracket ball end to retain the mounting bracket in its adjusted angular position, the coated surface of the reflector plate being operative to reflect light from the light bulb against the inner surface of the windshield to diffuse the glare of light passing through the windshield.

References Cited in the file of this patent

UNITED STATES PATENTS

| | | |
|---|---|---|
| 2,277,784 | Schlemmer | Mar. 31, 1942 |
| 2,621,282 | Novak | Dec. 9, 1952 |